Figure 1:
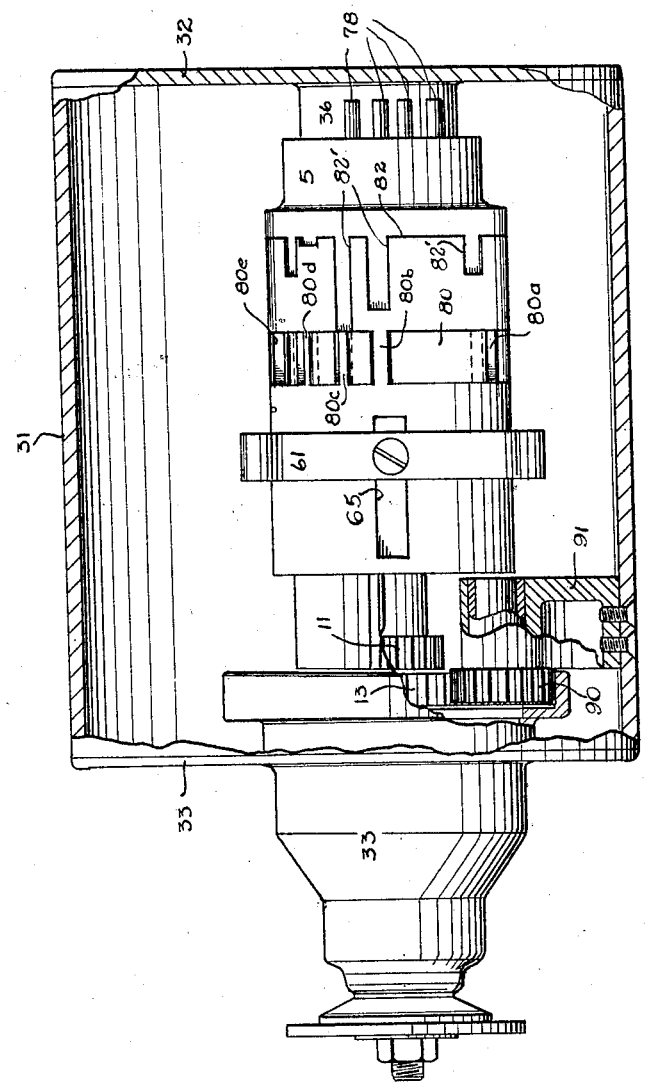

Oct. 23, 1928.

C. E. F. AHLM 1,688,844

TRANSMISSION GEARING

Filed Aug. 16, 1924

3 Sheets-Sheet 2

Inventor
Charles E. F. Ahlm
By Bates Macklin Goldrick & Teare
Attorneys

Patented Oct. 23, 1928.

1,688,844

UNITED STATES PATENT OFFICE.

CHARLES E. F. AHLM, OF EAST CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed August 16, 1924. Serial No. 732,387.

This invention relates to change speed transmission gearing and is particularly concerned with a gearing transmission in an automobile wherein compactness of design and the provision of a number of forward speeds together with reverse form important considerations.

The general objects of the invention are to provide a series of speed changes and a reverse by simple forms of internal and external gearing there being a series of internal gears in fixed relation on one member and a single external pinion on the other adapted to selectively engage the gears.

Certain features of this invention are shown in other applications filed by me, one of which is to arrange for movably supporting a driving or driven pinion entirely clear of gears with which it is intended to engage, and to move the pinion to a position wherein a portion of the teeth on the pinion align with the teeth on the driving or driven gear as the case may be, prior to bringing the pinion and gear teeth into definite positive engagement. The present invention, however, is characterized by the driving and driven members being permanently out of alignment, but with their axes parallel and stationary, there being an intermediate shaft carrying the external pinion which is shiftable transversely and longitudinally of its axis and which has a driving connection with the driving member through positive connecting means such as a sprocket chain which will permit its transverse bodily movement. By such means I am able to cause a shift of the external pinion from one internal gear to the other without having to move the propeller shaft which is usually quite heavy, due to its length, and at the same time I drive the pinion in the same direction as the propeller shaft. Wherefore the transmission may be used in standard types of cars without rearrangement of the driving unit or rear axle gearing. The type of chain which I contemplate using with this transmission is capable of transmitting a great amount of power with a minimum amount of noise. By such arrangement, I am enabled to connect the transmission directly to an engine or to the driven members of an already existing transmission without the use of universal couplings. The invention is perhaps particularly well adapted for larger vehicles such for example, as motor busses, trucks etc.

One of the features of my invention is that I have pivoted the intermediate and transversely shiftable driven member within the casing and have arranged for swinging it about its pivot, a single operating member serving to effect such swinging and to also cause the selected gears to engage. Further objects include the provision of a compact and efficient gear shifting mechanism which will be capable of causing the alignment of gears and subsequent driving engagement and which is also arranged to insure the engagement of a pair of geared members against accidental dislocation.

Other objects will become apparent from the further description of the preferred form of my invention illustrated in the accompanying drawings. The essential novel characteristics will be summarized in the claims.

Figure 2:
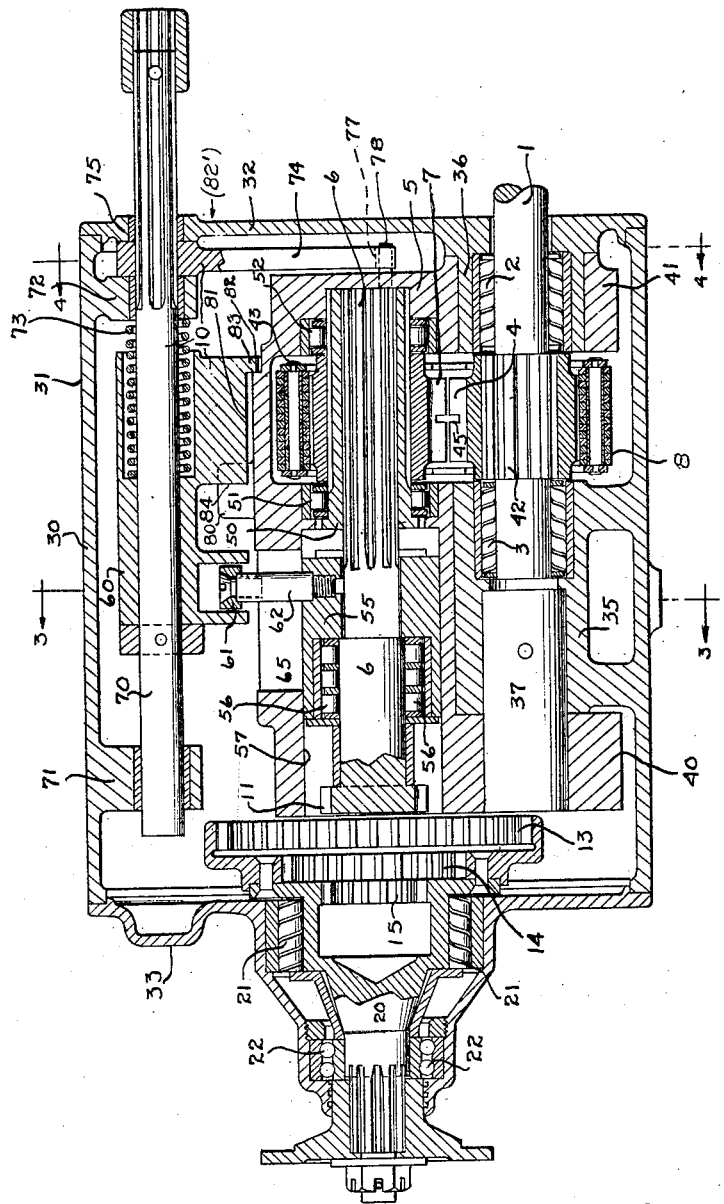
Figure 3:
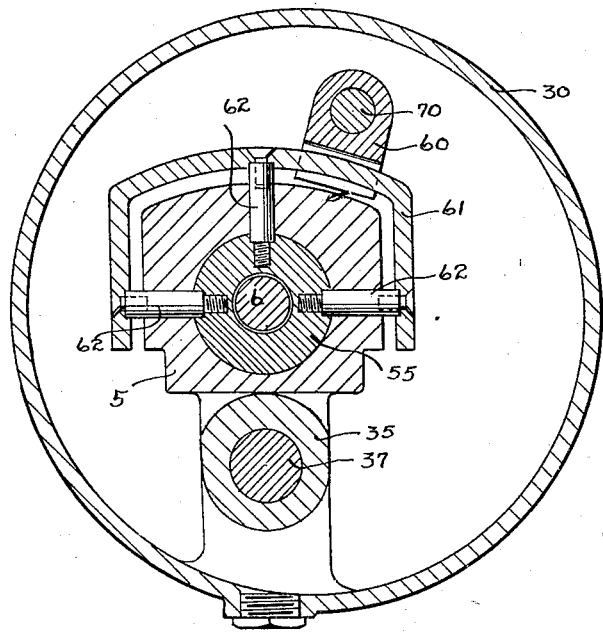
Figure 4:
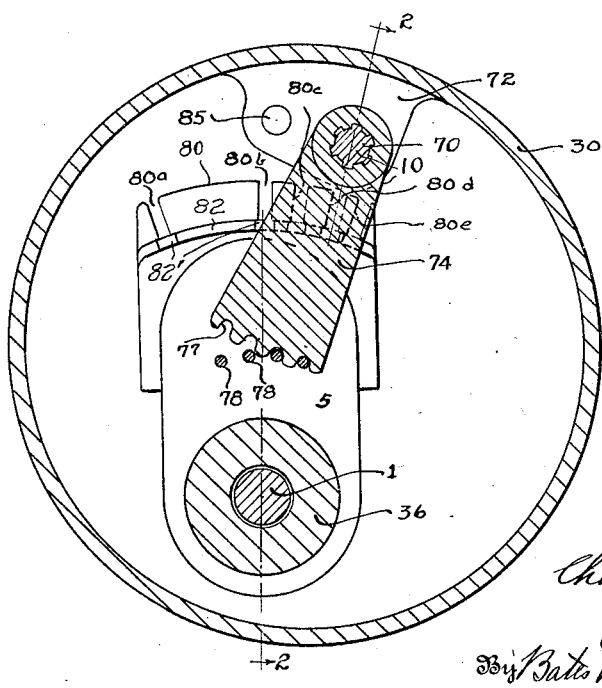

In the drawings, Fig. 1 is a sectional plan of my transmission with a portion of this casing and part of the gear shifting mechanism broken away. Fig. 2 is a substantially central longitudinal cross section as indicated by the lines 2—2 on Fig. 4; Fig. 3 is a transverse cross section as indicated by the lines 3—3 on Fig. 2; Fig. 4 is a transverse cross section taken substantially along the plane indicated by the lines 4—4 on Fig. 2.

For the purpose of more clearly setting forth the various features of my invention, I will briefly describe the preferred construction. The casing in general consists of a substantially cylindrical barrel preferably having brackets for supporting the various movable members of my mechanism, and which may be integrally formed therewith as shown. The ends of this casing are substantially closed, preferably by detachable front and rear end walls. One of these walls is shown as provided with a tubular extension for rigidly supporting the driven member which is shown as having a plurality of internal gears, each of different pitch diameters. A rockable frame and a main drive shaft which may be provided with a driving sprocket and which may be suitably connected to an engine or to an existing transmission are coaxially supported by brackets within the main housing. The rockable frame carries a longitudinally shiftable shaft carrying member, which shaft is also shown as splined within a sleeve carried by the rocking member and upon which is carried a second sprocket. The two sprockets are drivingly connected by a heavy flexible chain which will permit the swinging of the rockable shaft, while the same driving connection is maintained between it and the driving shaft. The swingably mounted shaft carries a pinion which may be shifted forwardly or rearwardly to engage or disengage the gears after the rockable frame is swung to its proper positions.

Referring to the drawings in detail by the use of reference characters, I have shown a driving shaft 1 suitably journaled within bearings 2 and 3 and carrying a driving sprocket or gear 4. I have shown a rockable frame 5 pivoted to swing about the axis of rotation of the shaft in a manner to be presently described. Within this frame I provide another shaft 6 at one side of the shaft 1 and in parallel relation thereto. A driving connection between the two shafts is established by a sprocket or gear 7, and a heavy chain 8 connecting the two sprockets. The shaft 6 is adapted to be moved longitudinally or transversely of its axis and I have shown suitable shifting mechanism indicated generally at 10 whereby a pinion 11 on the rearward end of the shaft 6 may be swung to the right from the direct driving position shown in Figs. 1 and 4 to selectively align with internal gears 13 or 14, or to the left to engage a reversing pinion 90.

I prefer to mount my entire mechanism within a substantially closed casing 30, comprising a barrel portion 31, provided with front and rear walls 32 and 33. I have found it most advantageous to make the casing in three separate parts, which may be secured together as by screws. An inwardly projecting bearing bracket 35 on the wall of the barrel portion 31 together with an inturned tubular portion 36 extending from the forward wall 32 constitutes my preferred method of supporting the driving shaft. The rocking frame 5 may be pivoted in any manner to swing about the shaft, but I prefer to provide a rearwardly projecting stud 37 which I have shown as securely embraced by the bracket 35 and which may be freely engaged by a downwardly projecting ear of bracket 40 extending from the frame. A similar bracket 41 is shown as engaging the exterior cylindrical surface of the tubular extension 36. In order to facilitate assembly, I prefer to spline or key the gear 4 to the shaft 1 at 42, and to connect the two sprockets, I preferably employ a compound link drive chain shown as having the central line of links entering peripheral slots 45 in each sprocket to prevent lateral displacement of the chain. I prefer to spline the sprocket 7 to a sleeve 50 suitably journaled in roller bearings 51 and 52 within the rockable frame and this sleeve may be in turn splined to the longitudinally movable shaft 6 within the sleeve.

Referring to Figs. 2 and 3, it will be seen that I have provided for moving the shaft 6 longitudinally by mounting one end of the shaft to turn freely within a circular block or head 55, roller bearings 56 being provided to eliminate friction between the block and shaft. The opening 57 is long enough to allow the necessary travel of the block 55 therein to bring the pinion 11 into position to engage the gears 13 and 14 and the clutch 15, and to allow its complete withdrawal from the gears and clutch to the neutral position shown in Fig. 2.

The longitudinal movement of the shaft 6 is accomplished through the agency of a yoked head 60, slidable on a shifting rod 70. The head is connected to the block 55 by suitable inwardly projecting pins 62, best shown in Fig. 3, which extend from a stirrup 61 through elongated openings 65 in the frame. The shifting rod 70 is mounted to slide in bearings 71 and 72 projecting inwardly from the shell 31, and is normally urged rearwardly by a compression spring 73. This spring is shown as thrusting inwardly against the head 60 and reacting on the bearing bracket 72 to hold the pinion shaft in selected position.

In order to swing the frame 5 into its various positions in which the pinion 11 will engage the driven gears, I prefer to provide a sector gear member 74 shown as splined to the rod 70 and held in place between the bearing bracket 72 and a boss 75 on the end wall 32. This member has a series of outwardly facing teeth 77 (Fig. 4) which engage pins 78 projecting forwardly from the frame 5. By the use of this very simple form of gearing I am able, by using the desired increase of motion, to cut down the lateral swing of the operating lever at the driver's position within the body of the car. Since it is sometimes desirable to provide for swinging the frame through a comparatively large angle to accomplish the desired speed changes, it will be understood that this is an important feature.

To limit the movement of the pinion as well as to locate it in its various gear engaging positions, I preferably provide a series of through slots (best shown in Fig. 1) in a raised upper portion 80 of the frame. The slots are indicated at 80$^a$ to 80$^e$ in rotation. A projection 81 depending into the slots from the head 60 has a shouldered heel 83 which bears normally while changing from one speed to another upon a curb 82 at the top of the frame. When changing to adjacent speeds, as from "low" through "intermediate" to direct drive or "high," it is only necessary to withdraw the pinion from mesh with whichever gear it is driving and then by rotating the frame cause the heel to ride along the curb until it reaches the next cut-away portion 82′. These cut-away portions of the curb allow the head to be pushed rearwardly by the spring to carry the pinion into engagement with the desired gear.

To accurately hold the pinion in its driving positions, a nicely fitting tongue 84 engages the slots 80ᵃ to 80ᵉ. Each cut-away portion 82′ is of such a depth as will allow the pinion to fully mesh with the corresponding gear. To prevent rotation of the head 60 about the shifting bar, I preferably provide a pin 85 (Fig. 4) which may extend rearwardly from the bracket 72, to slidably engage a similar projection (not shown) on the head 60.

To effect a reverse drive I have provided an idler gear 90 suitably journaled in a bracket 91 secured to the shell 31. This gear is permanently in mesh with one of the internal gears, 13 as shown. By swinging the teeth of the frame to the left from the neutral position the teeth of the pinion are carried to align with the idler when the guiding tongue 84 is aligned with the extreme right hand slot 80ᵉ.

It will be seen that I have provided a powerful, compact and simple transmission which is adapted to be effectively used in automotive machines of various types.

I claim:—

1. In a transmission the combination of a casing, a shaft journaled in the casing, a plurality of dental driven members rigidly carried by the shaft, another shaft carried by the casing permanently out of axial alignment with said first named shaft, an intermediate shaft, a laterally movable bearing therefor, said bearing being mounted to swing about the axis of rotation of said second named shaft, a chain for drivingly connecting said shaft to said intermediate shaft, a driving member in splined engagement with the intermediate shaft arranged to be moved into driving engagement with said driven members and means for so moving the driving member.

2. A transmission gearing comprising in combination a pair of permanently disaligned shafts having their axes of rotation parallel each to each, antifriction bearing within the casing for each of said shafts, internal gears carried rigidly by one of said shafts, a bodily movable frame pivoted within the casing and having its axis of rotation coincident with that one of the shafts, a bodily movable and rotatable member carried by said frame, flexible means for drivingly connecting the last named shaft to said bodily movable member to rotate it in the same direction, a pinion carried by said last named member and adapted to selectively engage the gears, means for selectively moving the frame and for longitudinally shifting said pinion carrying member, and an idler gear permanently in mesh with one of the internal gears and supported independently of the gears and adapted to be engaged by the pinion for reversing the direction of rotation of the gear carrying shaft.

3. A change speed transmission gearing comprising in combination a casing, a drive shaft, a driven shaft permanently out of axial alignment therewith, internal gears carried by the driven shaft within the casing, a frame mounted to swing about the axis of rotation of said first named shaft, a pinion shaft mounted on said frame having a pinion rigidly carried thereby, and adapted to be selectively moved into engagement with said internal gears, a roller bearing therefore adapted to move bodily with said pinion shaft, driving means in splined relation to said pinion shaft, means for drivingly connecting the first named shaft with said driving means, means for swinging said frame and subsequently moving said pinion longitudinally into engagement with said gears.

4. In combination, a casing, a drive shaft, a driven shaft permanently out of alignment therewith and mounted within the casing, gears rigidly carried by one of said shafts, a rockable frame within the casing and mounted to swing about the axis of rotation of the drive shaft, a pinion shaft drivingly connected to the drive shaft and carried by the frame and adapted to be selectively moved either longitudinally or transversally relative to the gears, means for imparting said movements having a laterally extending projection, and a yoke engaging said pinion shaft, a bearing member slidably mounted within said frame, and cooperating with said last named means to move the pinion into engagement with the gears and means carried by the frame cooperating with said projection for selectively rocking the frame so that the pinion may be moved to engaging position relative to the various gears.

5. In combination, a casing, a driving member and a driven member mounted within the casing and permanently out of axial alignment, a plurality of gears and a dental clutch on said driven member, an intermediate shaft having a pinion adapted to be swung into engagement with said gears or clutch, a pivotally mounted supporting frame therefor, having its axis of rotation coincident with the axis of the driving shaft, a roller bearing member for said pinion shaft slidably mounted in said frame, means for drivingly connecting the driving shaft with the pinion carrying shaft and means for bodily moving said pinion shaft and bearing into gear engaging position and for sliding the bearing with the pinion shaft to cause positive engagement between said pinion and gears.

6. In combination, a casing, a shaft journaled in the casing, a plurality of gears rigidly carried by the shaft, another shaft carried by the casing permanently out of axial alignment with said first named shaft, an intermediate shaft having a pinion, a bodily movable bearing therefor, said bearing being mounted to swing about the axis of rotation of said second named shaft to align the pinion with the gears, and to be shifted longitudinally to cause engagement therebetween, and means including a sleeve splined to the intermediate shaft and a gear member rigid with the sleeve for drivingly connecting said second named shaft to said intermediate shaft.

7. A transmission gearing comprising in combination a casing, a pair of shafts permanently out of alignment, having their axes of rotation parallel each to each, antifriction bearings within the casing for each of said shafts, internal gears carried rigidly by one of said shafts, a bodily movable frame pivoted within the casing and having its axis of rotation coincident with that of one of the shafts, a bodily movable and rotatable member carried by said frame, flexible driving means connecting the last named shaft to said bodily movable member, a pinion carried by said bodily movable member and adapted to selectively engage the gears, means for selectively moving the frame to drivingly align the pinion and gears and for shifting said pinion carrying member longitudinally to cause positive engagement therebetween, and means including a slidable bar, a spring and tongue carried thereby and slots in said frame cooperating with the tongue for maintaining the engagement between the pinion and gears.

8. A transmission gearing comprising in combination a casing, a drive shaft, a driven shaft permanently out of axial alignment therewith, internal gears carried by the driven shaft within the casing, a frame having a pair of brackets, means including cooperating brackets extending from the casing whereby the frame may be swung about the axis of rotation of said first named shaft, a pinion shaft mounted on said frame, a pinion rigidly carried thereby, and adapted to be selectively moved into engagement with said internal gears, a dental driven member in splined relation to said pinion shaft, a dental driving member between said frame brackets, and means for drivingly connecting the dental member.

9. In a gearing in combination, a casing, a pair of rotatable members projecting into the casing, means for drivingly connecting said members including an intermediate shaft having an angular bodily movement about the axis of one of said members, a chain drive connection between said last named member and said shaft whereby both the member and shaft is driven in the same direction and a selective connection between the shaft and said other member including a plurality of internal gears and an external gear, an operating member carried by the casing for bodily moving the shaft to cause the teeth of the external gear to align with teeth of the internal gears, resilient means and a carriage moved thereby having a connection with the last named shaft to cause the selected gears to drivingly engage and a connection between the said operating member and the carriage for disengaging such gears.

10. In a gearing in combination, a casing, a pair of rotatable members, means for drivingly connecting said members including an intermediate shaft having an angular bodily movement within the casing, a chain drive connection between said last named member and said shaft whereby both the member and shaft are driven in the same direction and a selective connection between the shaft and said other member including a plurality of internal gears and an external gear, an operating member carried by the casing axially parallel to the said shaft for bodily moving the shaft to cause the teeth of the external gear to drivingly align with the teeth of the internal gears, said operating member being arranged to have an angular movement less than the bodily movement of the shaft.

11. In a gearing of the class described adapted for use in a motor driven vehicle, a shaft extending into the casing and carried thereby, a shaft carried by the casing parallel with the first named shaft and permanently out of alignment therewith, an intermediate driving member for connecting the two shafts, a support for said intermediate member within the casing bodily movable on an axis coincident with that of the first named shaft, a plurality of internal gears drivingly rigid with one of the said shafts, an external gear carried by the other, means for causing the external gear to coact selectively with the internal gears, said means including the bodily movable support, and an operating member mounted parallel to the axis of the support and having a geared connection with the support, there being a positive driving connection between the first named shaft and the intermediate member so arranged that both these elements are driven in the same direction.

In testimony whereof, I hereunto affix my signature.

CHARLES E. F. AHLM.